(12) United States Patent
El-Batal

(10) Patent No.: US 6,192,027 B1
(45) Date of Patent: Feb. 20, 2001

(54) APPARATUS, SYSTEM, AND METHOD FOR DUAL-ACTIVE FIBRE CHANNEL LOOP RESILIENCY DURING CONTROLLER FAILURE

(75) Inventor: Mohamad El-Batal, Westminster, CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/146,825

(22) Filed: Sep. 4, 1998

(51) Int. Cl.[7] .............................. H03K 3/013; G06F 1/04
(52) U.S. Cl. ................... 370/222; 327/292; 714/1
(58) Field of Search ...................... 370/222, 506; 327/7, 157, 292–294; 714/1, 4, 5, 7

(56) References Cited

U.S. PATENT DOCUMENTS

| | | | |
|---|---|---|---|
| 4,025,720 | * | 5/1977 | Pachynski, Jr. ................ 370/506 |
| 5,592,519 | * | 1/1997 | Honakaer ......................... 327/7 |
| 5,694,615 | * | 12/1997 | Thapar et al. ..................... 714/1 |
| 5,703,511 | * | 12/1997 | Okamoto ........................ 327/157 |
| 5,742,415 | * | 4/1998 | Manning et al. ................ 359/128 |
| 5,862,313 | * | 1/1999 | Johnson et al. ................... 714/4 |
| 6,115,788 | * | 9/2000 | Thowe ............................. 714/7 |

OTHER PUBLICATIONS

"Advanced Product Information VSC7140", product data sheet, (Vitesse Semiconductor Corporation, Camarillo, CA; Mar. 13, 1998).

"Advanced Product Information VSC7120", product data sheet, (Vitesse Semiconductor Corporation, Camarillo, CA; Feb. 5, 1998).

* cited by examiner

Primary Examiner—Salvatore Cangialosi
(74) Attorney, Agent, or Firm—Flehr Hohbach Test Albritton & Herbert LLP

(57) ABSTRACT

This invention relates generally to Fibre Channel Loop topology in a computer system and more particularly to structure and method for by-passing a failed controller connected in a dual-active mode Fibre Channel Loop.

17 Claims, 7 Drawing Sheets

APPARATUS, SYSTEM, AND METHOD FOR DUAL-ACTIVE FIBRE CHANNEL LOOP RESILIENCY DURING CONTROLLER FAILURE

FIELD OF INVENTION

This invention relates generally to Fibre Channel Loop topology in a computer system, and more particularly to structure and method for by-passing a failed controller connected in a dual-active mode Fibre Channel Loop.

BACKGROUND OF THE INVENTION

In disc array systems, for example in JBOD (Just a Bunch Of Disks), RAID (Redundant Array of Independent Disks), or other systems having a plurality of devices, one or more controllers (for example disc controllers) are provided as interfaces between the host system and one or more devices (such as RAID disc devices). A Dual-Active system configuration provides maximum data availability and integrity between the Host system and the disk storage. During normal operation, the availability of two RAID controller communicating to the host provides greater data transfer bandwidth. In the event of a controller failure, the failover processor provides full data availability and integrity. A Fibre Channel is a high-speed I/O interface protocol that can be transferred over two categories of physical layers, copper or fibre optic cable.

When two Fibre Channel disk array controllers are used in a Dual Active system configuration it is important that the Dual Active system be able to continue normal operation even when either one of the two controllers has failed for any reason. Failure one controller may result, for example, from a defective electronic component in the controller, or loss of power to the controller, such as may occur if the controller power supply fails. Typically, a controller has an interface to the host system (either the I/O system host in the event that there are a plurality of I/O systems, or to an overall system host), and an interface to devices. In the discussion that follows, we will consider a host server system and a plurality of disk drives. For such a configuration, two areas are particularly problematic relative to ensuring the system's Fibre Channel Loop (FCL) resiliency during controller failure: (1) the controller's Fibre Channel (FC) Loop connection to the host servers; and (2) and the controller's Fibre Channel (FC) Loop connection to the disk drives.

One possible approach to maintaining FCL resiliency is now described relative to the typical Fibre storage system 30 in FIG. 1. In this multi-hub system 30, the FC Loop resiliency problem may be somewhat solved by managing each of the controller's FC Loops by a separate external FC Hub 34, 35 for each host and/or a separate external hub 50, 51, 52, 53 for each disc channel. The external hub 34 connects host server 31 to first host port (Hport1) 36, 38 associated with controllers 40, 41 and external hub 35 connects host server 32 to second host port (Hport2) 37, 39 of controllers 40, 41. In like manner hubs 50, 51, 52, 53 connect disc ports (Dport1, Dport2, Dport3, Dport4) 42, 43, 44, 45, 46, 47, 48, 49 with disk drive loops 1–4 (Disk Loop1, Disk Loop2, Disk Loop3, Disk Loop4) 54, 55, 56, 57.

This configuration somewhat solves the FCL resiliency problem because conventional FC Hubs, such as hubs 34, 35, 50–53, have typically been designed to connect multiple Loop agents together within a single Loop. In this configuration, each of the Hubs 34, 35, 50–53 should recognize the failure of any of its Loop agents (i.e. Hports 36–39, Dports 42–49, or Disk Loops 54–57, or Host servers 31, 32) based on the loss of meaningful FC signal, then bypass the failed Loop agent while ensuring adequate FC signal strength and quality in order for the Loop to continue normal operations. Such normal operation should be guaranteed even if the FC is implemented with maximum standard FC cable length, copper or optical fibre.

In order to accomplish these requirements the FC Hub ports 36–39 should meet at least the following two criteria. First, each FC Hub port (i.e. hub ports 36–39) should be able to intelligently discriminate between FC K28.5 characters on a FC clock frequency (within certain standard predetermined voltage levels) and random signal noise, to determine the proper operation and coherency of the Loop agent. Second, each the Hub (i.e. Hubs 34–35 and Hubs 50–53) should be able to sink into (that is synchronize with) the Loop's FC signal clock phase and frequency, then re-drive the Loop's FC signal clock with adequate signal strength and quality.

In order to meet these two criteria, FC externals Hubs 34–35, 50–53 must be of high quality, and being of high quality are by implication relatively expensive and bulky given the current state of the art in implementing such high-quality Hubs. Typically, each external hub would be implemented as an external enclosure typically measuring about 2"×12"×12" and requires its own AC power cable connection for operation. For example, the INTRA LINK 1000 Hub made by VIXEL of California, USA, could be used for this application. However, even if the expense and bulk of such high-quality external Hubs could be tolerated, the system 30 would still be vulnerable to certain Loop agent failure scenarios. For example, if the agent is transmitting random FC signals but has failed logically, the HUB would keep the failed agent on the FC loop which might eventually bring it down due to the random incoherent transitions and brake the connection between the rest of the loop agents. In addition, if a power loss to any of the FC external Hubs 34–35, 50–53 in the system 30 occurs, the connections of the Hub experiencing the power loss are immediately broken and the multi-hub system 30 will suffer from a single pointed failure. That is a single failure that is able to bring down the system, contrary to the intent of a dual-active system to protect against such single-point failure.

Therefore there is a need for a Fibre Channel Loop topology, structure, and method that provides the desired loop agent failure resiliency or redundancy without the expense of providing a separate external hub for each FC loop.

There is also a need for a Fibre Channel Loop topology, structure, and method that provides the desired loop agent failure resiliency or redundancy without the size and bulk associated with the plurality of external hubs.

There is also a need for a Fibre Channel Loop topology, structure, and method that will not experience a single point failure in the event of a power loss to some system components, that is there remains a need for resiliency and redundancy in the event of power failure.

SUMMARY OF THE INVENTION

The inventive structure and method provide communications loop resiliency loop failure in the event of a controller failure or problem, and is particulary useful in the environment of a dual-active ported fibre channel disk drive storage I/O server system. The failed controller is bypassed by a special circuit, refereed to as a loop resiliency circuit, which detects the failed controller on the basis of its output signal and selectively routes the signal received by the failed controller from the next downstream device connected on the loop to the output of the controller, so that the next upstream device can continue to operate on the Fibre Channel (or other) loop. Embodiments of the invention provide for dual-active ported devices, that is devices that are configured to communicate throus separate pairs of input/output ports, and typically coupled to two separate controllers. By maintaining the loop coherency in spite of the failed controller, the dual-ported discs remain accessible to the other controller and hence to the system as a whole.

In one embodiment, the invention provides a device bypass circuit (loop resiliency circuit) for a fibre channel communications loop which includes a first clock recovery circuit coupled to a first input port for receiving a first device signal from a first device and for generating a first regenerated device signal; a second clock recovery circuit coupled to a second input port for receiving a first controller signal from a first controller and for generating a first regenerated controller signal; a signal detection unit for detecting a valid first device signal and for generating a selector signal having a first state when a valid first device signal is detected and a second state when no valid first device signal is detected; and a switchable selector circuit receiving the first regenerated device signal, the first regenerated controller signal, and the first selector signal; the switchable selector circuit selectively passing one of the first regenerated device signal or the first regenerated controller signal in response to the first or second state of the first selector signal.

Another embodiment of the invention provides a Fibre Channel communication system having at least one controlled device; a first dual-active controller operable to control the at least one controlled device; a second dual-active controller operable to control the at least one controlled device; a first loop resiliency circuit coupled between the first controller and the controlled device; a second loop resiliency circuit coupled between the second controller and the controlled device; and a fibre channel communications loop extending between the controlled device and the loop resiliency circuit for providing Fibre Channel protocol compliant communications among and between the controlled device and the first and second controllers.

The invention also includes a method for bypassing the nonresponsive controller in order to maintain Fibre Channel Loop coherency. The method includes receiving, by a first device controller, a first input signal from a first controlled device over the Fibre Channel loop; reconditioning the first input signal to reduce noise and jitter; monitoring, by a signal detection circuit, the clock pulse timing characteristics of a first controller output signal from the first device controller derived from the first input signal to a second device controller; and selectively redirecting the reconditioned first input signal as the output signal of the first controller when the monitored signal fails to meet predetermined signal characteristics.

DETAILED DESCRIPTION OF EMBODIMENTS OF THE INVENTION

Figure 2:
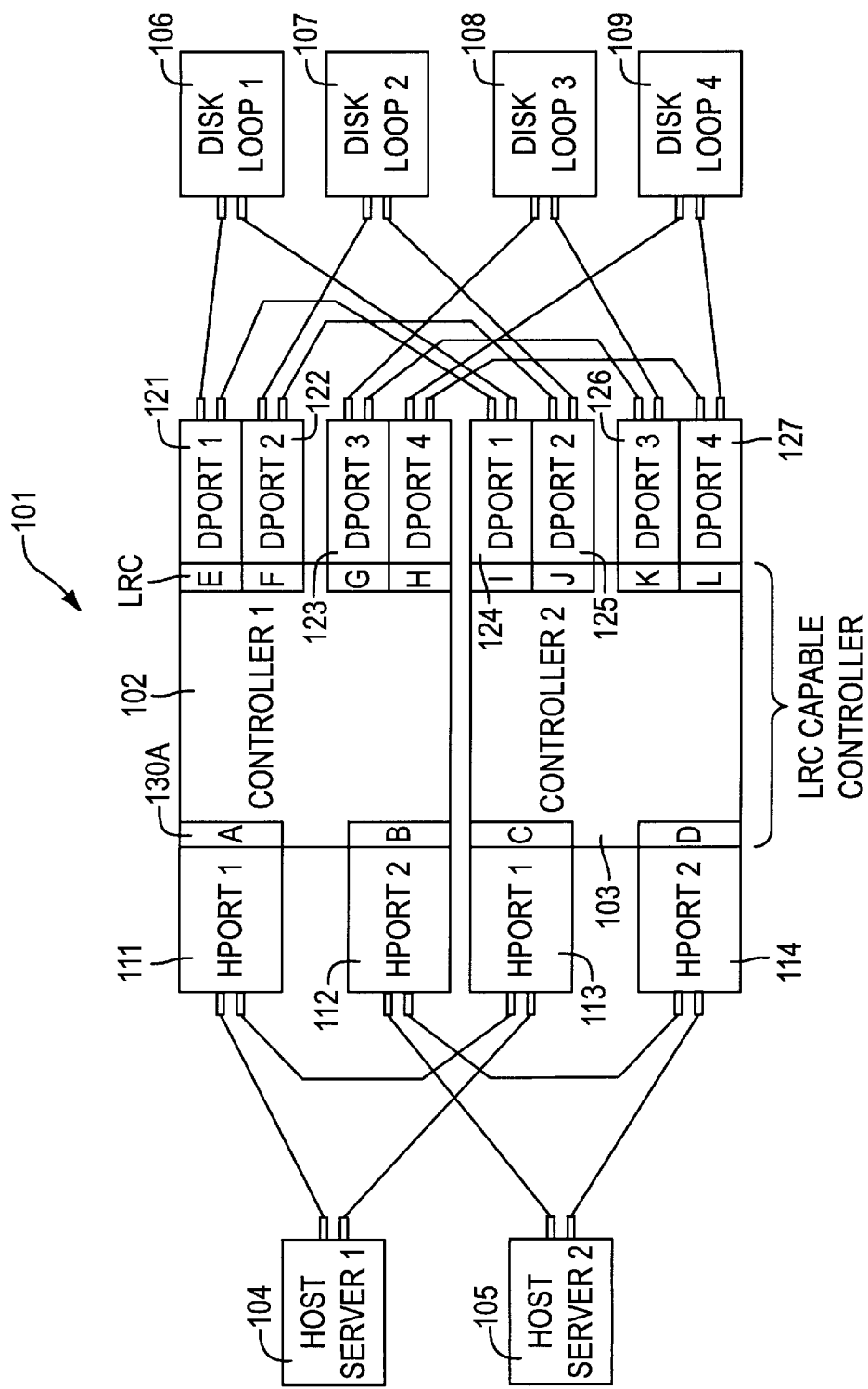
FIG. 2 is a diagrammatic illustration of an overview of a first embodiment of the inventive Host Server system which eliminates the need for external Hubs and provides resiliency from Fibre Channel Loop agent failure using inventive loop by-pass resiliency circuitry.

A first embodiment of the inventive structure and method is now described relative to the illustrative schematic diagram of a host server system 101 in FIG. 2. The inventive structure and method generally provide dual device controllers 102, 103 having a plurality of host ports 111, 112, 113, 114 and a plurality of disc drive ports 121, 122, 123, 124, 125, 126, 127, 128, which is particularly suited to Fibre Channel Loop communication links between the two host servers (host server 1, Host server 2) 104, 105, controllers 102, 103, and controlled devices, and which provides channel resiliency in the event of a controller or loop agent failure. In one particular embodiment, the inventive structure and method provide a RAID disc array controller system supporting dual 100 MB/s Fibre Channel host ports (i.e. host ports 1 and 2) and quad Fibre Channel disc ports (i.e. disc ports 1–4); however, those workers having ordinary skill in the art in light of the disclosure provided herein will appreciate that the inventive structure and method is not limited to this particular configuration, but rather may readily be extended to other communication links like, for example, 25 MB/s, 50 MB/s, and the 200 MB/s and 400 MB/s Fibre Channel communication links currently under consideration and/or development.

Aspects of the inventive structure and method are now described relative to the diagrammatic illustration in FIG. 2. The inventive system with FC Loop resiliency eliminates the aforementioned problems with conventional systems by including one or more Loop Resiliency Circuits (LRC) 130 in association with each host port 111–114 and/or disk port 121–127, preferably internal to and on the same board as the controller 102, 103 itself. We note that although the inventive LRC may be used for selected ones of the host ports and/or for selected ones of the disk ports, full advantage of the inventive structure and method are achieved by applying the inventive LRC to each of the ports. Of course, in some instances, the controlled devices may not fully support the inventive structure and in such cases at least partial benefit of the inventive structure and method will be realized by applying it where possible.

Figure 1:
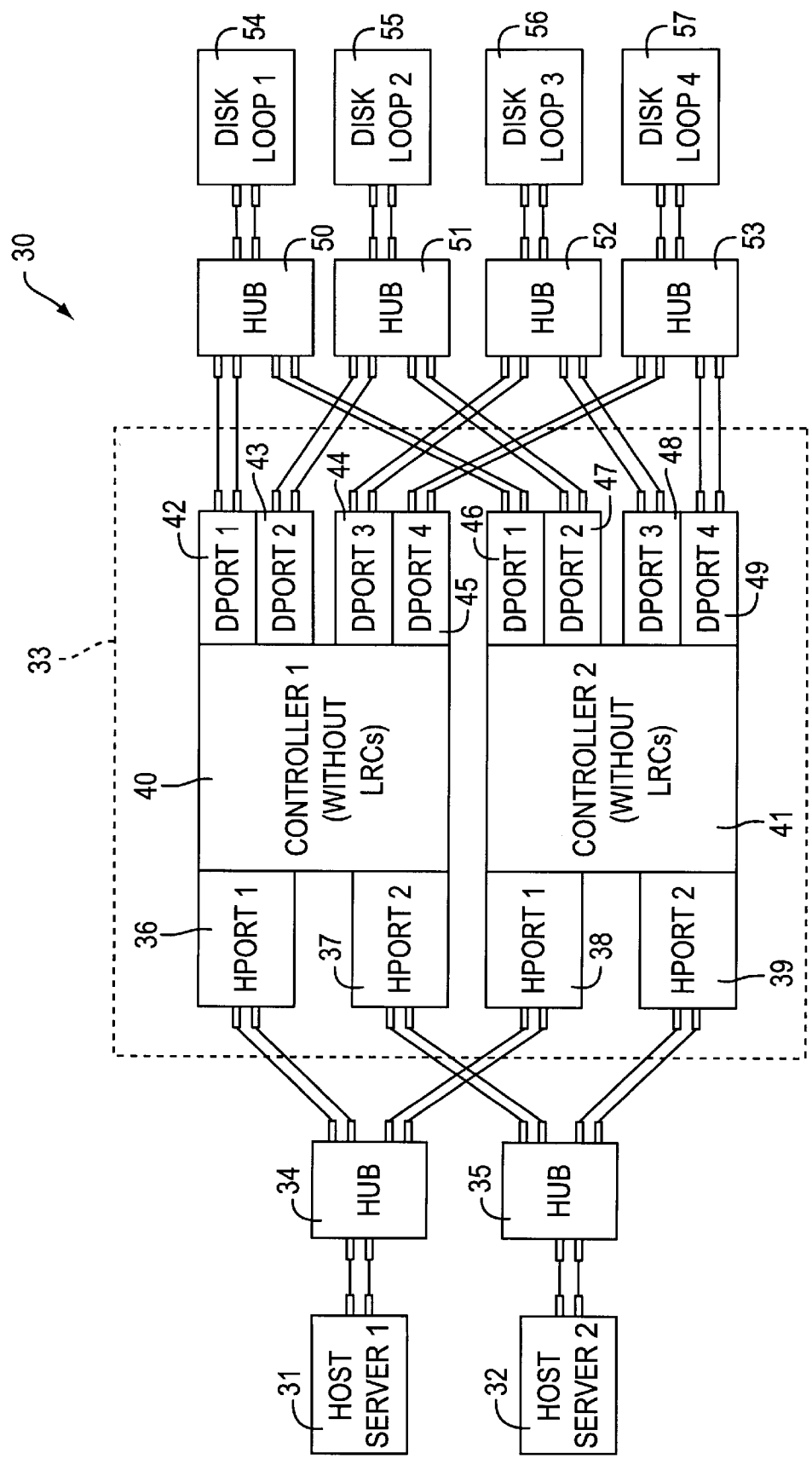
FIG. 1 is a diagrammatic illustration of a Host Server system having a plurality of external Hubs to provide resiliency from Fibre Channel Loop agent failure.

In one embodiment of the invention, a Loop Resiliency Circuit 130 is provided for each host-controller FC link and each disc device FC link. These circuits are generally show within the controllers 102, 103 and designated by 130A, 130B, 130C, 130D, 130E, 130F, 130G, 130H, 130I, 130J, 130K, 130L. Each LRC 130 effectively provides an alternative path, or by-pass path, to maintain the integrity of the loop in the event of a controller failure for any reason, in the dual-active controller configuration. We note that the inventive structure in FIG. 2 eliminates six external Hubs 34–35, 50–54 required to provide loop resiliency in the system of FIG. 1.

We now describe one embodiment of the Loop Resiliency Circuit 130 as it is used to implement a FC Loop extending between a host server (such as for example host server 104 in FIG. 2) or disk loop (such as for example disk loop1 106 in FIG. 2) and two controllers (such as for example Controllers 102 and 103 in FIG. 2). When the circuit is implemented for the disk loop, it is understood that the disk loop includes one or a plurality of disk drives or disk array systems such as RAID systems. In addition it should be understood that loop or network configurations other than Fibre Channel (optical or electrical) may be provided without departing from the invention. It should also be understood that controller may be a controller interfacing to systems or devices other than a host computer, input/output host, disk drives, RAID arrays, other storage devices or arrays, networked printers or terminals, and any other type of computer or electronic devices.

Figure 3:
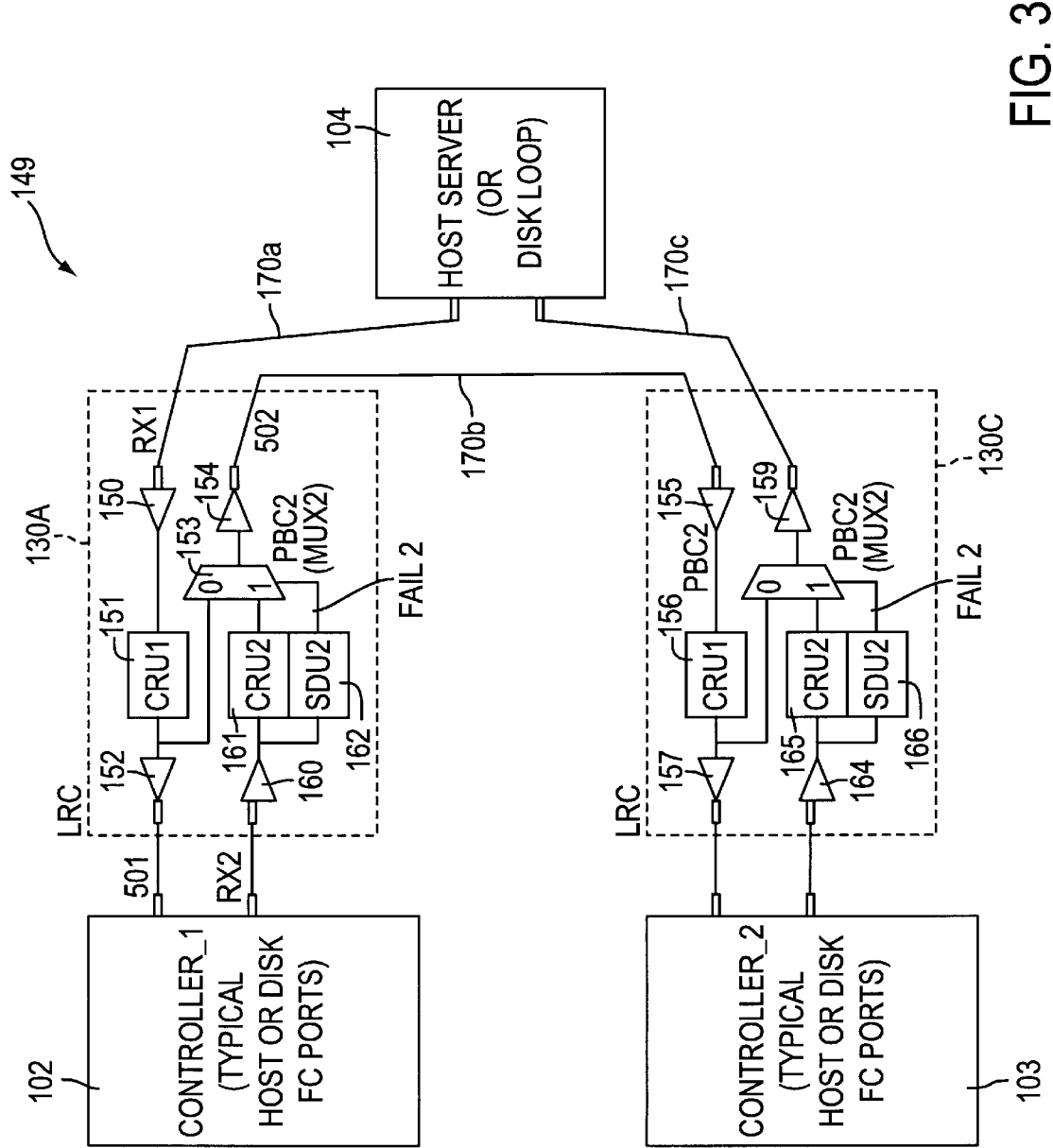
FIG. 3 is a diagrammatic illustration showing detail of a first embodiment of the inventive loop by-pass resiliency circuitry interposed between first and second controllers and a host server (or, alternatively a disc device loop).

In the embodiment of the inventive structure 149 in FIG. 3, the loop extends from host server 104 to a first input port receiving the RX1± differential signal pair through a signal buffer circuit (shown with a differential-to-single ended buffer symbol) 150, the conditioned signal being communicated to Clock Recovery Unit (CRU1) 151 that recovers the clock signal and regenerates the incoming clock with data on the RX1± signal pair from the external device, conditions that incoming data and attenuates any uncommon parasitic noise and jitter that may be present. Although the provision of signal buffers at the input and output terminals of LRC 130, such as signal buffer circuits 150, 152, 154, and 160, are preferred, they are not required to utilize the essential features of the invention. It is noted that for a Fiber Channel Loop, the devices must operated at a very high speed, and that the data is "encoded" within the clock pulses themselves. The characteristics of Fibre Channel communications are known in the art and not described in detail here.

The output of CRU1 is coupled to a second signal buffer 152 and to port bypass circuit (PCB2) 153 which for purposes of this invention acts as a two-input multiplexer 153. It should however, be noted that the multiplexer 153 must be of a type that can operate to selectively switch between the two very high speed inputs and maintain Fibre Channel signal fidelity. Advantageously, the multiplexer or switch 153 is implemented using a port bypass circuit such as may be available in commercial devices (See for example, the description of Vitesse Semiconductor Corporation Model VSC7140 which describes clock recovery circuitry, signal detection unit circuitry, and port bypass circuitry, elsewhere in this specification).

Signal buffer 152 generates standard SO1±(that is SO1+ and SO1−) signals to the input port of the first controller 102. The reconditioned output of CRU1 151 is also coupled or connected to a first input ("0" input) of a two input multiplexer (MUX, PCB2) 153 which operates to selectively couple the CRU1 output back to amplifier 154 and back to the Fibre Channel loop in the event the controller 102 is not operating or is not operating properly. The manner in which the operational failure is detected is described subsequently. PBC/MUX 153 also receives the output signal from a second clock recovery unit (CRU2) at is second input ("1" input). CRU2 161 receives the RX2± signal pair via signal buffer 160 from the output port of controller 102, and after recovering the clock and regenerating a new clean clock couples the regenerated clock signal to the second PCB/MUX input ("1" input).

A Signal Detect Unit (SDU2) 162 coupled to CRU2 161 and to the output of buffer 160 to receive the signal conditioned RX2± signal pair and detects the loss of a coherent signal and determines whether the incoming signal (if present) is valid or alternatively contains invalid Fibre Channel data, and generates a failure signal FAIL2) when the incoming signal is invalid. Rules for determining signal validity or non-validity are implemented in logic and based on FC Channel standard signal protocol. For example, if an incoming signal is not present, then the FAIL2 signal is asserted, and if a signal is present but is not recognized to contain and "K28.5" FC characters which is an essential part of conventional FC protocol communications at the present time, then the FAIL2 signal is also asserted. During normal operation the FAIL2 signal is not asserted. In the embodiment illustrated in FIG. 3, the FAIL2 signal from SDU2 acts as a PCB/MUX 153 selection signal to select the "0" input signal (from the output of CRU1) and communicate it to the SO2± output and thereby bypass controller 102 to maintain the loop 170. During normal operation of controller 1, FAIL2 is not asserted, and the output of CRU2 161 is coupled via buffer 154 to the SO2± output.

The structure and operation of the inventive structure and method, including Loop Resiliency Circuit 130B is the same as that already describe for Loop Resiliency Circuit 130A. The connectivity to different ports of controller 1 and controller We merely note that in the embodiments of the invention provided here, each loop extending from the host server 104 (or devices) includes two such LRCs, the first LRC 130A interposed between the host server 104 and the first controller 102, and the second LRC 130C interposed between the host server (or disk drive devices) 104 and the second controller 103. Furthermore, as illustrated in the embodiment of the inventive structure 101 of FIG. 2, several pairs of LRC are provided extending between a host server 104 or 105 and two of host ports 111–114 controlled by a different one of controllers 102 or 103. Similarly, each of Disc Loops 106–109 is coupled to two of disk ports 121–127 controlled by different controllers 102 or 103.

Those workers having ordinary skill in the field of Fiber Channel communications will appreciate that high channel bandwidth and the commensurate clock rate of Fibre Channel communications benefit from particular device characteristics. For example, the characteristics of signal buffers, clock recovery units, signal detection units, and port bypass circuits or multiplexers, require circuit implementations that are compatible with Fibre Channel signaling requirements. In light of this conventional knowledge, a complete review and specification of conventional Fibre Channel signaling requirements is not provided here but is available in standard Fibre Channel reference materials. Rather, a brief functional description of the controllers, signal input/output buffer circuits, clock recovery circuits, signal detection units, and port by-pass circuits are described immediately below.

Each of controllers 102, 103 may be of conventional design and for example, any FC compliant Disc Array controller may be used with the inventive LRC 130 structure and method. However, in order to utilize the optional logic circuitry, the controller would need means for generating the Loop-Disable signal. Therefore, for example to use the loop-disable signal logic, each controller would additionally provide the Loop disable signal from the ISP2x00 devices. For example, the inventive structure and method may advantageously be used with the Mylex Model DAC9600xx series (Mylex Corporation, 4900 Pearl East Circle, Suit 104, Boulder Colo. 80301) of RAID disk array controllers providing dual 100 MB/sec Fibre Channel host ports and quad Fibre Channel disc ports.

Signal input buffer circuits 150 and 160 receive differential PECL technology compatible signals RX1+, RX1− and RX2+, RX2− respectively and generate SO1+, SO1− and SO2+, SO2− output signals. The buffers isolate the internal chip technology from the external signal levels and eliminate incompatibility issues that might otherwise arise. Signal output buffers 152, 154 provide analogous function for the output. Provision of signal buffers between chips is well known in the art and are typically provided for compatibility purposes rather than as an essential feature of the circuitry, and we do not describe them further here Clock recovery circuits CRU1 151 and CRU2 161 each function in the manner of a typical clock recovery unit which operate to synchronize into the phase and frequency of the incoming clock signal then injects a matching fresh clock signal in order to enhance the signals strength and quality to normal standard levels while cleaning up parasitic noise and eliminating excess jitter. Signal detection unit (SD2) is a device that is capable intelligently discriminated between a coherent protocol compliant signal stream with the correct voltage levels and clock frequency and random parasitic noise or a broken connection situation, and then designate the status of the signal with a FAIL/GOOD flag. Port by-pass circuit (PBC2) functions as a simple switch circuit, or in other words a 2 to 1 multiplexer, that selects one of it's two input signals to pass as it's output at one time based on the logic level of it's SELECT control signal "1" or "0".

Each of these CRU, SDU, and PBC circuits may be implemented in a variety of ways as is known in the art and not described further here, except for the specific example of the Vitess Semiconductor VSC7140 exemplary design.

Figure 4:
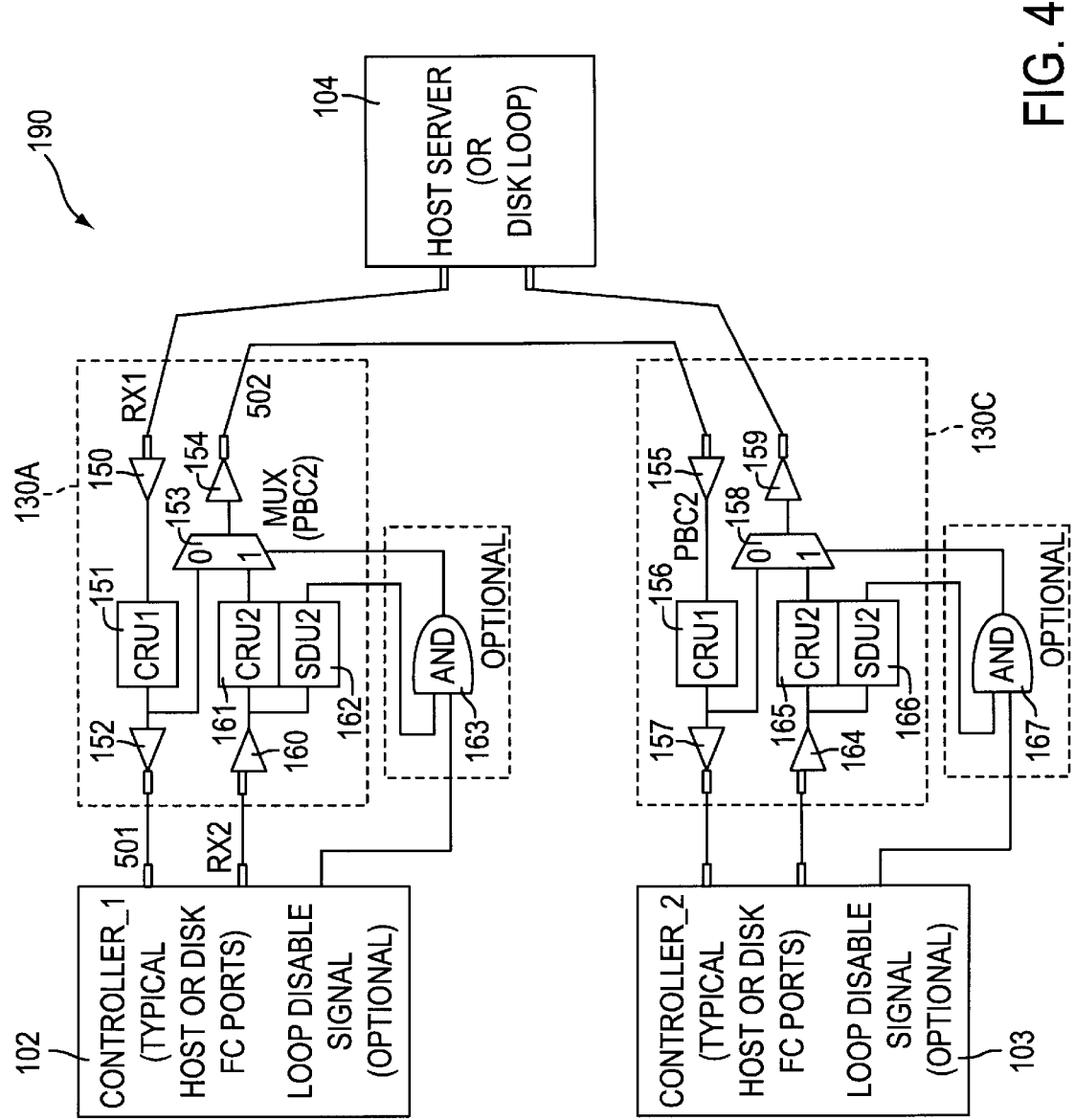
FIG. 4 is a diagrammatic illustration showing an enhancement to the embodiment in FIG. 3 wherein additional logic is provided responsive to a failure condition within the controller.

In FIG. 4 there is illustrated an alternative embodiment of the inventive structure 190 which includes additional optional logic circuitry or other logic means, such as for example an AND gate 163 in LRC 130A and an AND gate 167 in LRC 130C. Each AND gate 163, 167 is coupled to the respective FAIL2 output of SDU2 162, 166 at a first input terminal and is coupled to receive a loop disable signal (LOOP-DISABLE) from respective controller 102, 103. The loop disable signal is advantageously generated by logic elements on the controller under software and/or firmware control according to predetermined rules or detection criteria, when anomalous behavior is sensed or detected.

The enhancement in the embodiment of FIG. 4 provides the additional reliability over the first embodiment by providing a Loop Disable "active low" output from the controller devices (for example for Mylex ISP2100FC I/O Processor devices). The loop-disable signal is ANDed with the Failure detection output (e.g. FAIL2 signal) from the SDU 162, 167 output and feed into the PCB2 as the select signal. This allows each of the Fibre channel controller devices to put themselves out of the loop whenever a controller problem (such as hardware of firmware based problem) is detected, even though such controller problem detection may occur before the loss of signal is detected by the SDU2 in some cases. As a further optional enhancement, a pull-down (not shown) may be provided on this loop-disable signal to ensure port bypass in the event of a controller removal or power loss. The additional logic means may be provided within the controller or within the LRC. Furthermore, in any of the embodiments of the invention, the LRC itself may be and is advantageously provided internal to, that is on the same board as the controller.

Figure 5:
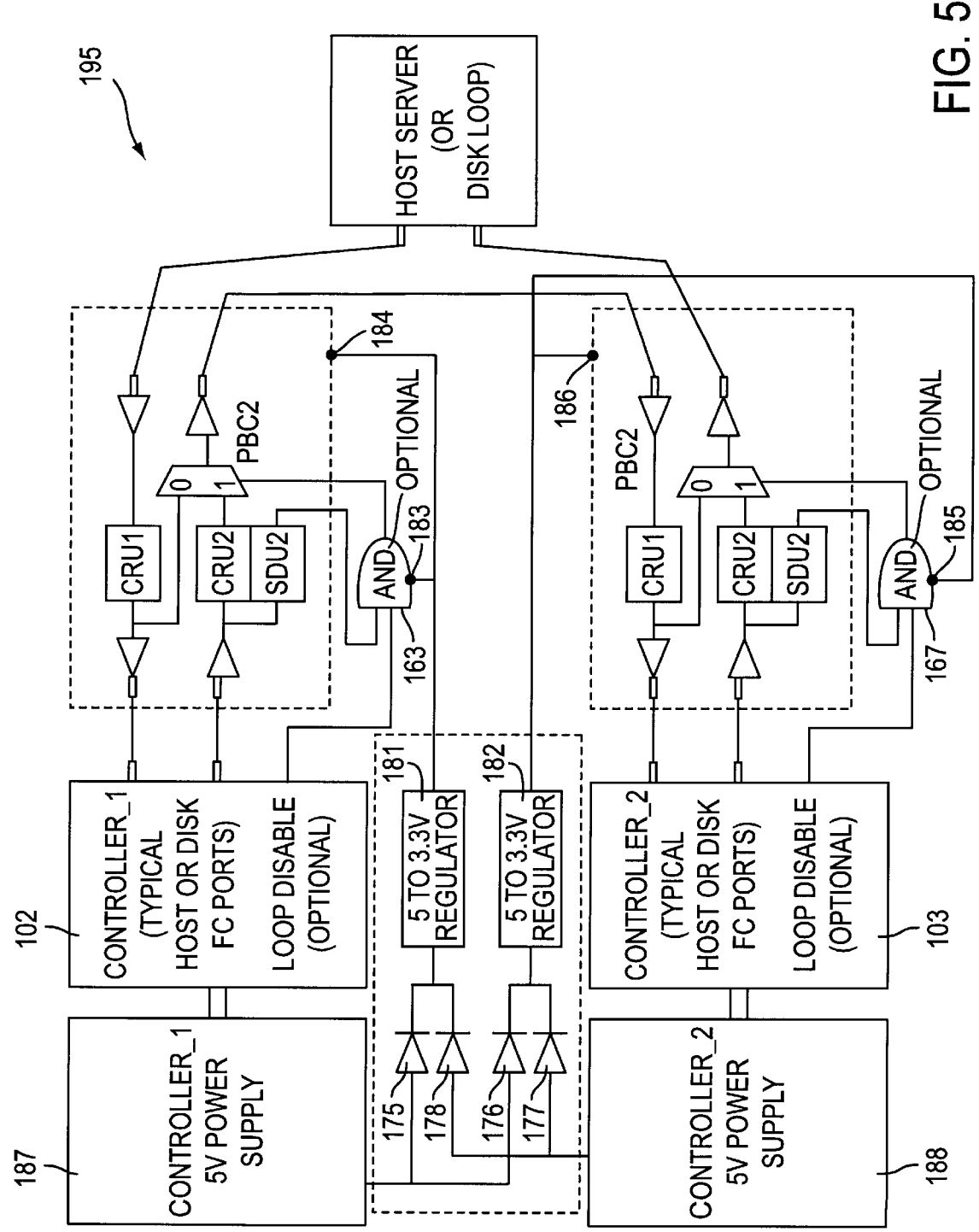
FIG. 5 is a diagrammatic illustration showing detail of a second embodiment of the inventive loop by-pass resiliency circuitry illustrated in FIG. 4 and adding an optional power-supply redundancy circuitry.

A second alternative embodiment of the inventive structure 195 is now described relative to the diagrammatic illustration in FIG. 5. Here, in addition to providing the loop-disable signal and the associated logic means, additional protection and resiliency is provided in the event of a power loss to one of the dual controllers configured in the loop. Here, the inventive structure provides for redundant power sources for the LRCs and/ or loop-disable logic circuitry from each of the two controllers' power supplies. If one of the two power supplies fail, the LRCs associated with the dead power supply's controller are kept active with power from the surviving controller power supply, and as a result are able to keep the Loop up and running even when a power loss related controller fail over occurs.

In this embodiment, first and second power supplies 187, 188 are shown associated with a respective controller 102, 103. (Power supplies are used with the two earlier embodiments but not explicitly shown since would be of conventional type and are not relevant to the invention.) Each power supply generates a nominal 5 volt output which is communicates to its controller and to a pair of forward biased Schotky diodes (for example, Model 30BQ015 diodes made by International Rectifier of California, USA may be used). In particular, first power supply 187 provides its 5 volt output to first diode 175 and to second diode 176. In like manner, second power supply 188 provides its 5 volt output to third diode 178 and to fourth diode 177. The outputs of the first diode 175 and third diode 177 jointly provide an input voltage to a first voltage regulator 181, here a 5 volt to 3.3 volt regulator, which supplies operating power to LRC 130A, and to the optional AND gate 163. Analogously, the outputs of the second diode 176 and fourth diode 178 jointly provide an input voltage to a second voltage regulator 188 which supplies operating power to LRC 130C, and to the optional AND gate 167. Provision of power to the LRC and to the AND gates are shown diagrammatically by the connection of a single line from the regulators 181, 182 to the LRCs and AND gates at nodes 183, 184, 185, and 186.

The diodes provide a low forward voltage drop of about 300 mV Max at full power utilization. This allows an output voltage level of about 4.7 Volt or greater from a 5.0 Volt input supply. A low dropout positive linear voltage regulator (for example, a model No. LT1117 5V -to-3.3V regulator made by LINEAR TECHNOLOGY CORPORATION of California, USA may be used) provides a regulated 3.3 Volt voltage power supply to the LRCs and to the AND gate even at input voltages ranging from about 6 Volt down to about 4.3 Volt, thus allowing for more than 10% power supply high or low voltage margin. Of course the voltage levels and diode voltage drops are merely exemplary, and the invention is not limited to these particular values.

Three embodiments of the invention, each including clock recovery units (CRU) , signal detection units (SDU), port bypass circuits (PBC), and signal buffer circuits (SBC) have been described. We have also described the functional features of each of these types of circuits and it will be clear to those workers having ordinary skill in the art, having read this specification, that there are many alternative ways to implement the inventive structures and methods. We now describe one particular implementation wherein the loop resiliency circuits 130 are implemented using selected circuitry components available on a commercially available electronic part or component, with the modifications described hereinafter.

In particular, the LRCs 130 may be implemented using modified commercially available dual Fibre Channel repeater, such as a VSC7140 (made by Vitesse Semiconductor Corporation, 741 Calle Plano, Camarillo, Calif. 93012) to provide the Loop bypass device. This is successor to the VSC7120 device which has been used in many conventional Fiber Channel Hubs. The VSC7140 is an example of a Dual Fibre Channel repeater circuit which can be used in Hubs, JBODs, or other Fibre Channel Subsystem requiring clean incoming and outgoing signals at a bulkhead connector. Here, the term "bulkhead" refers to the portion of the storage system which contains the main interface core, such as the controller cards, distribution board, and connectors in a host-disk array system of FIG. 2.

Figure 6:
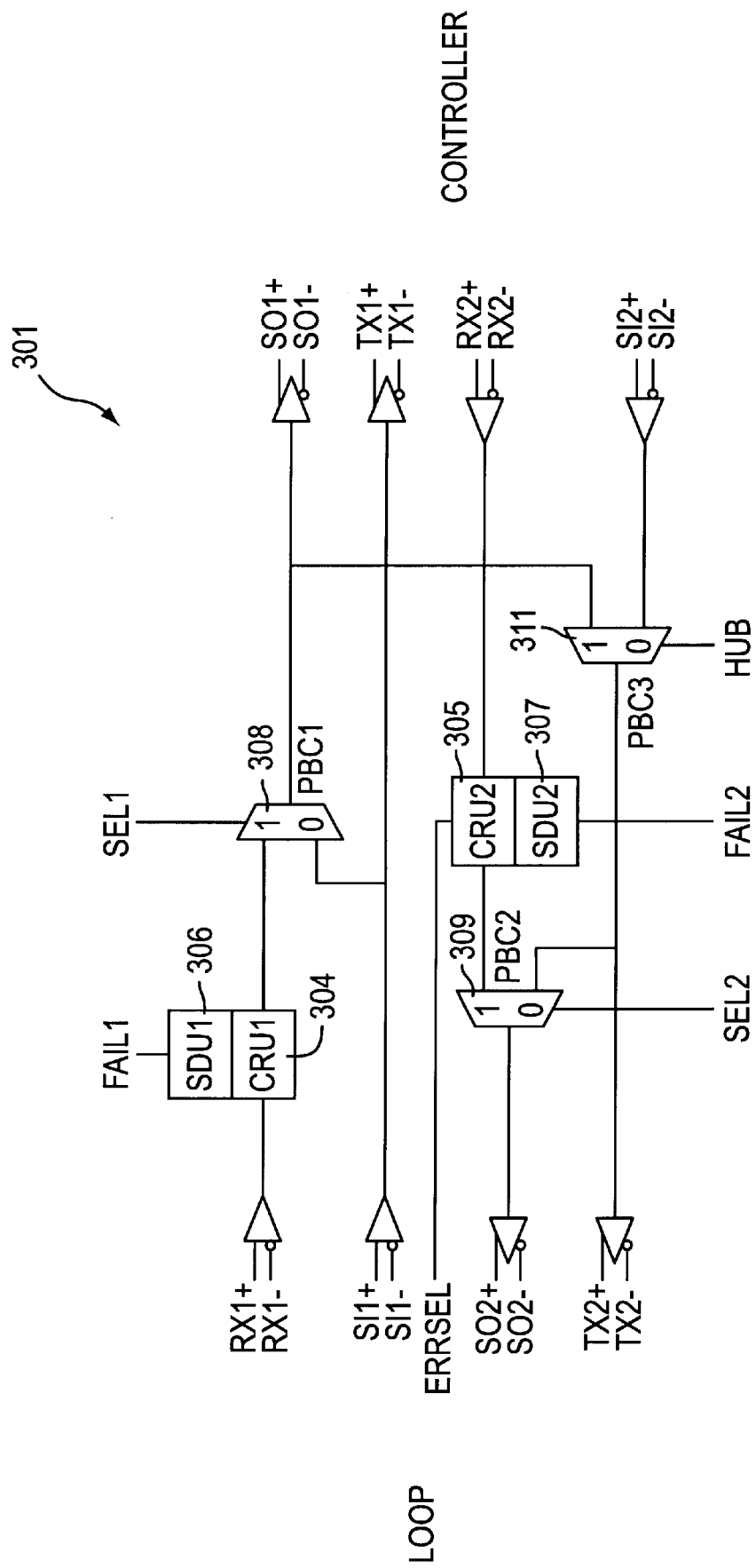
FIG. 6 is a diagrammatic illustration showing detail of a commercial Fibre Channel Repeater/Hub circuit.

In its conventional commercial configuration 301, illustrated in FIG. 6, the VSC7140 includes digital Clock Recovery Units (CRU1 and CRU2) 304, 305 that recover incoming data on the RX1+, RX1− pair and RX2+, RX2− pair of signal lines from an external device, buffers the incoming data and attenuates any noise or jitter that may be present in the data. Two digital Signal Detect Units (SDU1 and SDU2) 306, 307 coupled to a respective Clock Recovery Unit 304, 305 determine whether the incoming signal is valid or alternatively contains invalid Fibre Channel data, and generate output FAIL1- and FAIL2- signal depending on the status of the signal. A first two-way (2:1) multiplexer forms a first Port Bypass Circuit (PBC1) 308 to select and route either recovered incoming data (e.g. RX1+, RX1−) from CRU1 or SI1±(SI1+,SI1−) to SO1±(SO1+, SO1−) in response to a first (SEL1) signal. In analogous manner, a second 2-way (2:1) multiplexer forms a second Port Bypass Circuit (PBC2) 309 to select and route either recovered incoming data (e.g. RX2+, RX2−) from CRU1 or SI±(SI2+, SI2−) to SO2±(SO2+, SO2−) in response to a second select (SEL2) signal. A third 2-way multiplexer forms a circuit (PBC3) 311 which selects either the (SO1+, SO1−) pair or the (SI2+, S12−) pair depending on the state of a HUB input selector signal.

In one typical application where Fibre Channel subsystems require signal "cleanup" at the bulkhead, the incoming signal from the bulkhead is connected to the RX1+, RX1−-terminal pair, the output pair SO1+, SO1−-to the internal subsystem's input, the output of that same subsystem to the RX2+, RX− terminal pair, and the output pair SO2+, SO2− to the bulkhead, thereby forming a loop from the bulkhead to RX1 through the VSC7140 and out through SO2 to the bulkhead.

Figure 7:
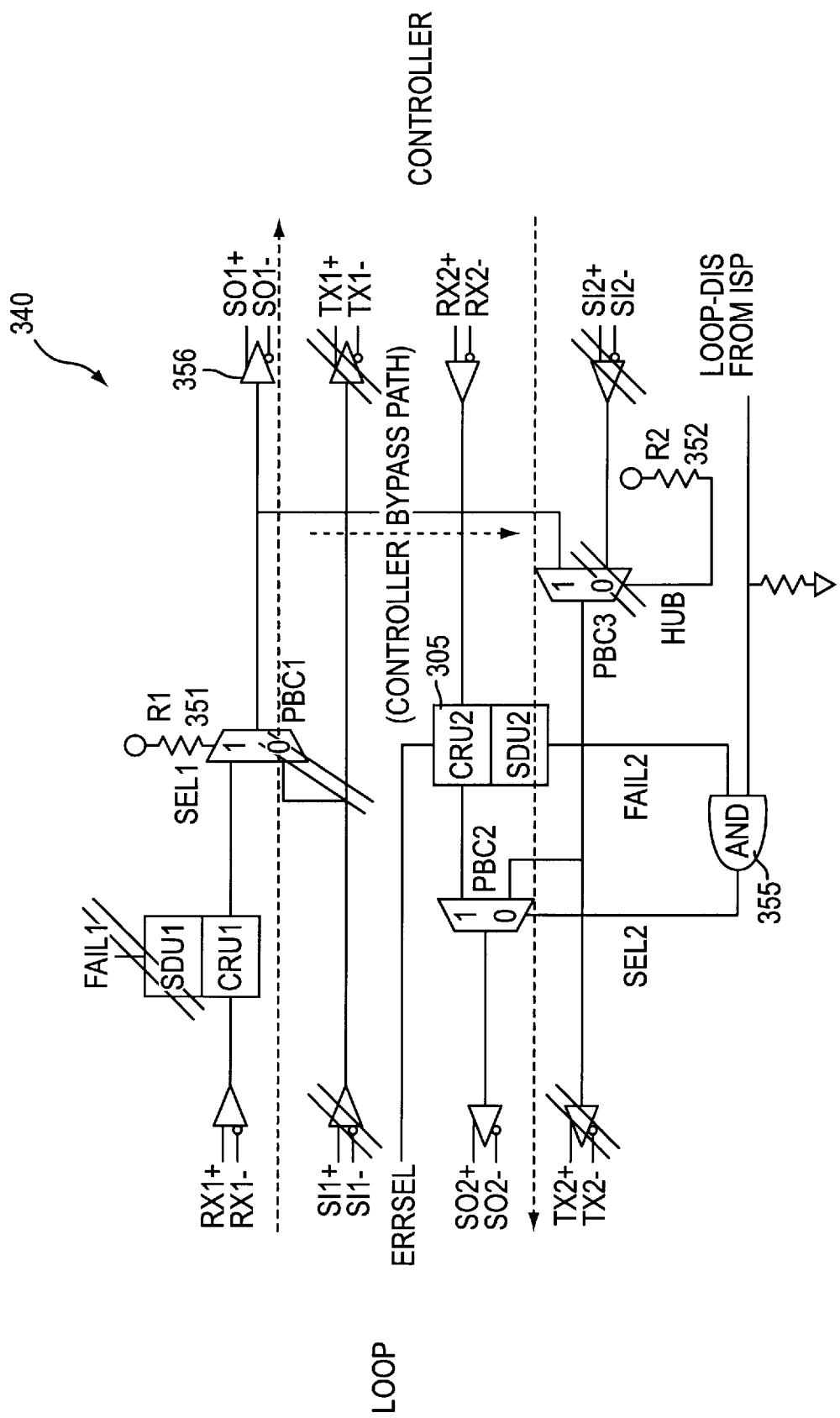
FIG. 7 is a diagrammatic illustration showing the manner in which the commercial Fibre Channel Repeater/Hub circuit illustrated in FIB. 6 may be modified to provide structures useful for a third embodiment of the inventive structure and method.

In one embodiment of the invention, illustrated in FIG. 7, selected components from the VSC7140 circuit are used and/or connections between the circuit components are modified. As a result of these changes, inputs to SI1 and S21 and outputs to TX1 and TX2 are eliminated. Having eliminated the SI1 and SI2 inputs, multiplexers PCB2 309 and PBC3 311 are no longer required and the "0" input having been left unconnected, the "1" input receiving the SEL1 signal is tied through a resistor R1 351 to power (+5V) and the "1" input receiving HUB is tied through resistor R2 352 to power (+5V). Furthermore, SDU1 307 is no longer used because no loop signal verification is desired in this particular embodiment. Instead, a firmware controlled (LOOP-DIS) signal is received from the ISP2100 and ISP2200 in the Mylex DAC960FF Controller and provided as a first input to two-input AND gate 355, which also receives the FAIL2 signal from SDU1, and generates SEL2 as its logical output and used as the PBC2 selector input signal SEL2.

This controller bypass circuit forms a first signal path from the RX1 terminals connected to the host or disc loop, through CRU1 304 and PBC1 308 (which no longer functions as a port bypass circuit but only as a buffer), and through isolation buffer 356 to the SO1 output terminal pair to the controller. The controller is connected to the RX2 pair through the CRU2 305 and the "1" input of PBC2, to the SO2 output terminals connected to the loop. Therefore during normal operation, that is operation during which no controller failure was detected by either the ISP2X00 devices or the SDU2 detecting a loss of signal, a loop is formed from the RX1 terminals to the SO2 terminals through the controller. However in the event that either the SDU2 experiences a loss of signal or the ISP2X00 experiences a loop-disable signal due to a firmware error, for example if the controller had a physical failure of one of its I/O FC connections, or if the ISP2X00 detects that the controller firmware is no longer issuing the correct protocol commands, then a controller bypass path is formed from a node following CRU1 to the "0" input of PBC2, which when the SEL2 is in a state to select the "0" terminal input, is passed through to the SO2 output terminals to complete the loop. The SEL2 signal selects the CRU1 signal rather than the CRU2 signal when the FAIL2 signal from SDU2 and the loop disable signal (LOOP-DIS) from the ISP2X00 devices are both enabled. The SDU2 enables FAIL2 when the Signal Detect Units SDU2 307 determines that the incoming signal from RX2 is not valid and for example does not contain valid Fibre Channel data. PBC2 also receives at its "1" input the redriven and enhanced controller signal from RX2 when the signal is valid and contains valid Fibre Channel Data.

A functional block diagram of the standard commercial VSC7140 is illustrated in FIG.6. The VSC7140 contains two integrated repeaters to improve signal quality and determine whether the input to the repeater contains valid or invalid Fibre Channel data. Each repeater consists of a Clock Recovery Unit (CRU) and a digital Signal Detect Unit (SDU). The CRU locks onto the incoming signal, generates a recovered clock (nominally 1.0625 GHz) and uses this clock to resynchronize the incoming signal. The recovered data typically has improved signal quality due to amplification and jitter attenuation. Recovered data is retimed to the recovered clock (not to the reference clock REFCLK). Suitable design of the CRU typically may eliminate any need for a Lock-to-Reference signal since, in the absence of data, CRU locks onto REFCLK automatically thereby eliminating the need for any external control.

The Signal Detect Units (SDUs) test the recovered data from the CRUs for invalid Fibre Channel data by looking for run length errors (for example, more than 5 consecutive 1's or 0's) and the absence of a seven bit pattern found in the "K28.5" character of either disparity ('0000101' or '1111010'). This K28.5 pattern should occur between all valid Fibre Channel frames according to standard protocol. The maximum length of a Fibre Channel frame at the time of this writing is 2148 bytes (or 21,480 encoded bits) and the VSC7140 SDU divides time into 1½ maximum frames with a 15-bit counter (approximately 31 microseconds). At the end of each interval, any run length or K28.5 errors which occurred during the interval are stored internally for use by the state machine which drives the SDU output signal, FAILn- (e.g. FAIL1- and FAIL2-).

The ERRSEL input controls both SDUs while the FAILn- outputs provide the status of each SDU. ERRSEL selects two different modes generated by the SDU; Single Frame (LOW) or Multiple Frame (HIGH) error modes. In Single Frame Error Mode, any error condition that occurs within the 1½ frame interval causes FAILn- to be asserted LOW immediately after that interval. FAILn- remains asserted until immediately after an error free interval. In Multiple Frame Error Mode, FAILn- is asserted after four consecutive intervals containing errors and remains asserted until after four consecutive error-free intervals occur. The intent of the Multiple Frame Error Mode is to allow FAIL1- or FAIL2- to be directly connected to the Port Bypass Circuit controls, SEL1 or SEL2, in order to configure the port to isolate RX1 or RX2 whenever invalid data is present. Single Frame Error Mode allows the user to develop their own algorithm for monitoring data and controlling SEL1 or SEL2.

A TTL reference clock signal, REFCLK, is used by an internal Clock Multiplier Unit (CMU) to generate a baud rate clock (nominally 1.0625 GHz). If REFSEL is HIGH, CMU multiplies REFCLK (nominally 106.25 MHz) by a factor of ten. If REFSEL is LOW, CMU multiplies REFCLK (nominally 53.125 MHz) by a factor of twenty. REFSEL should be properly set in order to match the frequency of REFCLK.

Three Port Bypass Circuits (PBC) contain differential 2:1 multiplexers (MUXs) operating at 1.0625 Gb/s for routing serial data. SEL1 configures PBC1 to select either the output of CRU1 (HIGH) or SI1 (LOW) to drive SOT. SEL2 configures PBC2 309 to select either the output of CRU2 305 (HIGH) or the output of PBC3 311 (LOW) to drive SO2. HUB configures PBC3 311 to select either the output of PBC1308 (HIGH) or SI2 (LOW) to drive the input to PBC2309.

The Vitesse Semiconductor VSC7140 is conventionally intended for two applications, Dual Repeater or Dual Hub, as configured by HUB. Rtime both incoming and outgoing signals at the bulkhead of a Fibre Channel system may be accomplished through the use the VSC7140 in Dual Repeater Mode (HUB is LOW, while building Fibre Channel Hubs may configure the VSC7140 in Dual Hub mode (HUB is HIGH) to fully handle the functions of two Hub Nodes. Other characteristics of the VSC7140 are described in the Vitesse Semiconductor Corporation VSC7140 Advance Product Information G52180-0, Rev. 2.1 dated Mar. 13, 1998, which is hereby incorporated by reference.

It can be seen that the connectivity suggested by the VSC7140 product information is different from that utilized by the inventive structure and method. Neither are the structures of the Loop Resiliencey Circuits illustrated or described, nor the system configuration utilizing the LRCs. The provision of logic circuitry receiving a loop-disable signals as well as the provision of redundant power supplies to the LRCs 130 and the logic means are also new.

Each of the two VSC7140 integrated devices includes a Clock Recovery Unit (CRU), a Signal Detection Unit (SDU) and a Port Bypass Circuit (PBC) plus one additional PBC was used to switch between the two. The overall VSC7140 includes two CRUs, two SDUs and three PCBs out of which we used two CRUs, one SDU and one PBC. In our unique configuration of the VSC7140 we did not use any external loop back connections and not all of the internal functionality was used as noted by slashes in the illustration of FIG. 7. In normal mode of operation CRU1 re-drives and enhance the incoming signal into the controller, CRU2 re-drives and enhance the outgoing signal from the controller, PCB1, PCB2 and PCB3 are in the "1" path, SDU1 is unused, SDU2 is constantly monitoring the controller's transmit signal. Bypass mode could be triggered by two sources: (1) the SDU2 detects a signal problem, or (2) the ISP2100, ISP2200, or Host loop driven LOOP-DIS signal is asserted. Both could switch PCB2 into the bypass path redirecting RX1± signal instead of RX2± out to SO2± while the RX1± incoming signal is still being re-driven and enhanced by CRU1 and the Loops signal traffic integrity is maintained.

Those workers having ordinary skill in the art in light of this description will appreciate that the same or equivalent circuitry components, other than those provided by the VSC7140 .

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

I claim:

1. A device bypass circuit for a fibre channel communications loop, said circuit comprising:

a first clock recovery circuit coupled to a first input port for receiving a first device signal from a first device and for generating a first regenerated device signal;

a second clock recovery circuit coupled to a second input port for receiving a first controller signal from a first controller and for generating a first regenerated controller signal;

a signal detection unit for detecting a valid first device signal and for generating a selector signal having a first state when a valid first device signal is detected and a second state when no valid first device signal is detected; and a switchable selector circuit receiving said first regenerated device signal, said first regenerated controller signal, and said first selector signal; said switchable selector circuit selectively passing one of said first regenerated device signal or said first regenerated controller signal in response to said first or second state of said first selector signal.

2. The circuit in claim 1, wherein said device comprises a disk array controller.

3. The circuit in claim 1, wherein said device comprises a host computer controller.

4. The circuit in claim 1, wherein said first device signal includes an incoming clock signal component and said first clock recovery circuit operates to: (i) synchronize into the phase and frequency of said incoming clock signal, and (ii) generate said regenerated clock signal component from said incoming device clock signal component; said regenerated clock signal component substantially matching said incoming clock signal but enhancing said incoming signal amplitude and quality to predetermined standard signal amplitude and quality levels including reducing parasitic noise and jitter.

5. The circuit in claim 1, wherein said signal detection unit is operable to intelligently discriminate between a valid coherent protocol compliant signal stream with the correct voltage levels and clock frequency and either no signal or an invalid signal failing to provide either correct voltage levels or correct clock frequency; said signal detection unit generating a signal indicative of the valid/invalid status of said signal.

6. The circuit in claim 1, wherein said invalid signal includes random or pseudo-random noise.

7. The circuit in claim 1, wherein said switchable selector circuit is operable as a two-input one-output multiplexer that selects one of said two-input's and passes said selected input as an output in response to a multiplexer select signal.

8. The circuit in claim 7, wherein said multiplexer select signal is derived from a signal generated by said signal detection unit.

9. The circuit in claim 7, wherein said switchable selector circuit comprises a port bypass circuit.

10. The circuit in claim 1, wherein said circuit comprises a loop resiliency circuit.

11. A Fibre Channel communication system comprising:
   at least one controlled device;
   a first dual-active controller operable to control said at least one controlled device;
   a second dual-active controller operable to control said at least one controlled device;
   a first loop resiliency circuit coupled between said first controller and said controlled device;
   a second loop resiliency circuit coupled between said second controller and said controlled device; and
   a fibre channel communications loop extending between said controlled device and said loop resiliency circuit for providing Fibre Channel protocol compliant communications among and between said controlled device and said first and second controllers.

12. The system in claim 11, wherein said controlled device comprises at least one hard disc drive for storing data and/or commands.

13. The system in claim 11, wherein said controlled device comprises a host I/O server.

14. The system in claim 11, wherein said system comprises a plurality of controlled devices including a disc array subsystem and a host I/O server.

15. The system in claim 11, wherein each said first and second loop bypass circuit comprises:
   a first clock recovery circuit coupled to a first input port for receiving a first device signal from a first device and for generating a first regenerated device signal;
   a second clock recovery circuit coupled to a second input port for receiving a first controller signal from a first controller and for generating a first regenerated controller signal;
   a signal detection unit for detecting a valid first device signal and for generating a selector signal having a first state when a valid first device signal is detected and a second state when no valid first device signal is detected; and
   a switchable selector circuit receiving said first regenerated device signal, said first regenerated controller signal, and said first selector signal; said switchable selector circuit selectively passing one of said first regenerated device signal or said first regenerated controller signal in response to said first or second state of said first selector signal.

16. The system in claim 11, wherein
   said first device signal includes an incoming clock signal component and said first clock recovery circuit operates to: (i) synchronize into the phase and frequency of said incoming clock signal, and (ii) generate said regenerated clock signal component from said incoming device clock signal component; said regenerated clock signal component substantially matching said incoming clock signal but enhancing said incoming signal amplitude and quality to predetermined standard signal amplitude and quality levels including reducing parasitic noise and jitter;
   said signal detection unit is operable to intelligently discriminate between a valid coherent protocol compliant signal stream with the correct voltage levels and clock frequency and either no signal or an invalid signal failing to provide either correct voltage levels or correct clock frequency; said signal detection unit generating a signal indicative of the valid/invalid status of said signal; and
   said switchable selector circuit comprises a port bypass circuit and is operable as a two-input one-output multiplexer that selects one of said two-input's and passes said selected input as an output in response to a multiplexer select signal.

17. In a Fibre Channel Loop connected information storage and retrieval system, a method for bypassing a non-responsive input/output or disk array controller to maintain Fibre Channel Loop coherency, said method comprising the steps of:
   receiving, by a first device controller, a first input signal from a first controlled device over said Fibre Channel loop;
   reconditioning said first input signal to reduce noise and jitter;
   monitoring, by a signal detection circuit, the clock pulse timing characteristics of a first controller output signal from said first device controller derived from said first input signal to a second device controller; and
   selectively redirecting said reconditioned first input signal as the output signal of said first controller when said monitored signal fails to meet predetermined signal characteristics.

* * * * *